Figure 1:
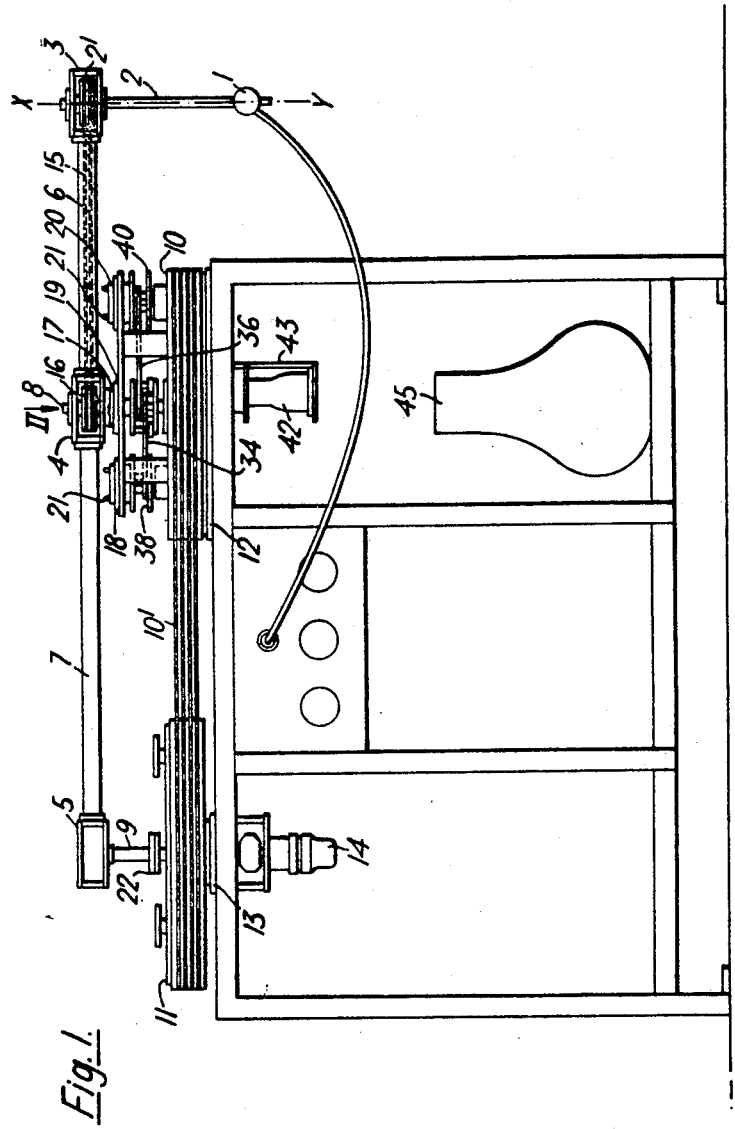

April 26, 1966  G. A. D. GORDON  3,247,709
ULTRASONIC TEST APPARATUS FOR PRODUCING
CROSS SECTIONS OF SOLID BODIES
Filed June 1, 1962  5 Sheets-Sheet 4

Inventor
George A. D. Gordon
By Baldwin & Wight
Attorneys

United States Patent Office 3,247,709
Patented Apr. 26, 1966

3,247,709
ULTRASONIC TEST APPARATUS FOR PRODUCING CROSS SECTIONS OF SOLID BODIES
George A. D. Gordon, Friston House, 25 Church Road, Richmond, Surrey, England
Filed June 1, 1962, Ser. No. 199,307
Claims priority, application Great Britain, Jan. 5, 1962, 585/62
12 Claims. (Cl. 73—67.8)

This invention relates to tomographs of the kind employing a probe which is supplied with bursts of ultrasonic energy to detect, by the echo of the energy, surfaces which are concealed but which reflect the energy.

In such apparatus the echo is usually displayed in the form of a bright area on the screen of a cathode ray tube. If the cathode ray is deflected to form on the screen a trace which is linear in relation to time, the distances between the probe and the reflecting surface are proportional to the distance on the screen between the bright spot caused by the transmitted pulse and the bright spot caused by the echo.

As good echoes are obtained only when a surface is normal to the incident beam, it is necessary to scan a complex object from a multiplicity of angles and from a multiplicity of probe positions. The summation of echo patterns produced in this manner has, in the past, been carried out by using radar techniques whereby the position of the linear trace on the screen is made to alter in step with the movements of the probe, while a continuously open camera records the bright spots produced whenever an echo occurs. In its application to medical work for example, the patients are the test objects and the probe is either kept continuously in contact with the patient's skin or the patient is in some way surrounded with water at the site being examined and the probe moves freely in the water.

The main purpose of the present invention is to replace the complex radar circuitry by a simple mechanical device which will not alter in its function when once it has been correctly adjusted and which will enable electronic methods to be reduced to a minimum and thereby make it possible to operate the machine without skilled engineers.

According to the present invention the probe is so mounted in a support that it can turn on the support about an axis at right angles to the beam of ultrasonic rays which it emits and the support itself is movable to carry the probe so that the said axis is movable through a path curved about the suspected position of the surface to be explored.

In its use the device would be positioned so that the virtual axis passes approximately through the object being examined: the support would then be moved and the probe turned simultaneously in the support through equal angles at either side of the setting in which its beam is directed at the virtual centre. The combined effect of simultaneous angular movements of the probe in the support and of the support itself is to cause the emitted beam to pass through the object being examined from a multiplicity of angles and probe positions depending on the relative speeds of the two movements.

Provision is made to give a visual or a recorded indication of the paths swept by the beam emitted from the probe and of any echo which is obtained so as to enable the position of the surface to be determined with precision.

A further feature of the invention consists in providing, in association with the support, means to cause the sweeping movement of the probe to be transmitted to a component at a point remote from the probe position where the position of the component (corresponding to the position of the probe) is convenient for making a visual record.

For obtaining accuracy of a high order, the probe should be immersed in a liquid which extends to the object containing the surface to be detected; the velocity of ultra-sonic energy in the liquid is approximately the same as in the object so that the beam travels through both liquid and object without refraction and the distances between probe and reflecting surface remain proportional to distances between corresponding bright spots on the cathode ray tube screen.

Apparatus according to this invention is capable of general use in medicine and industry.

Figure 2:
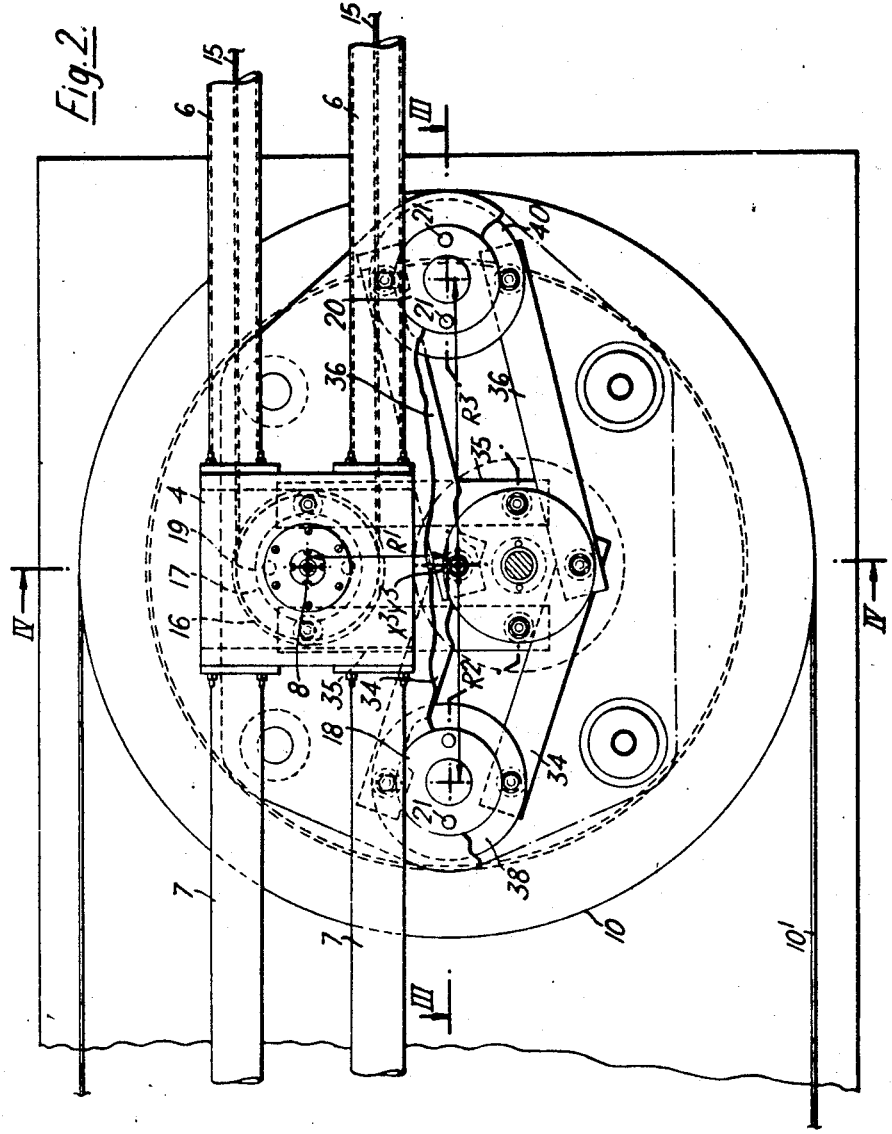
Figure 3:
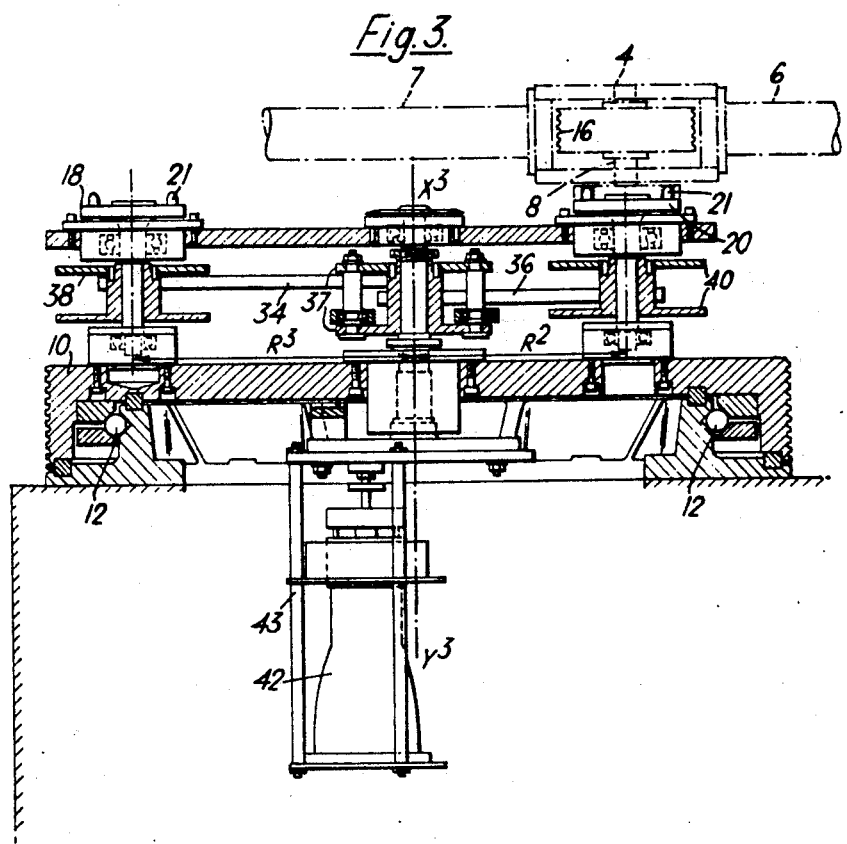
Figure 4:
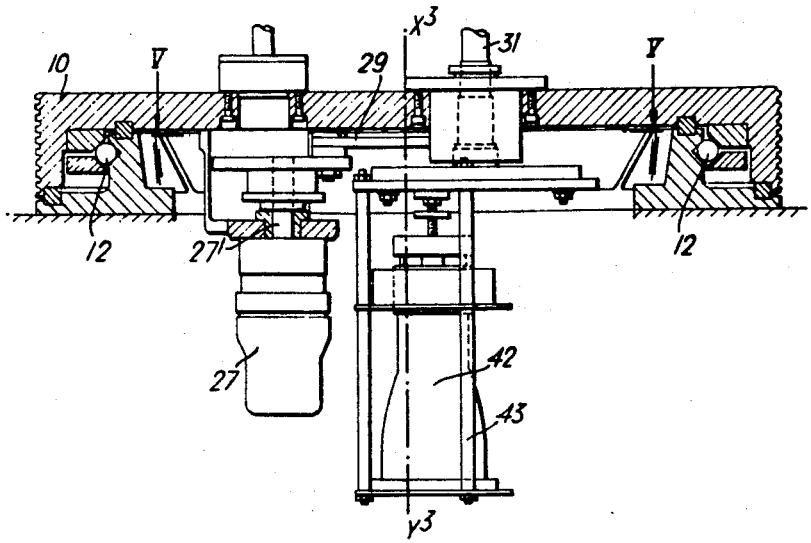
Figure 5:
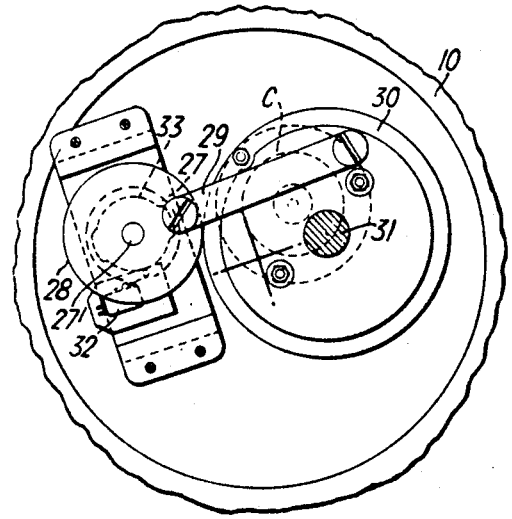
Figure 6:
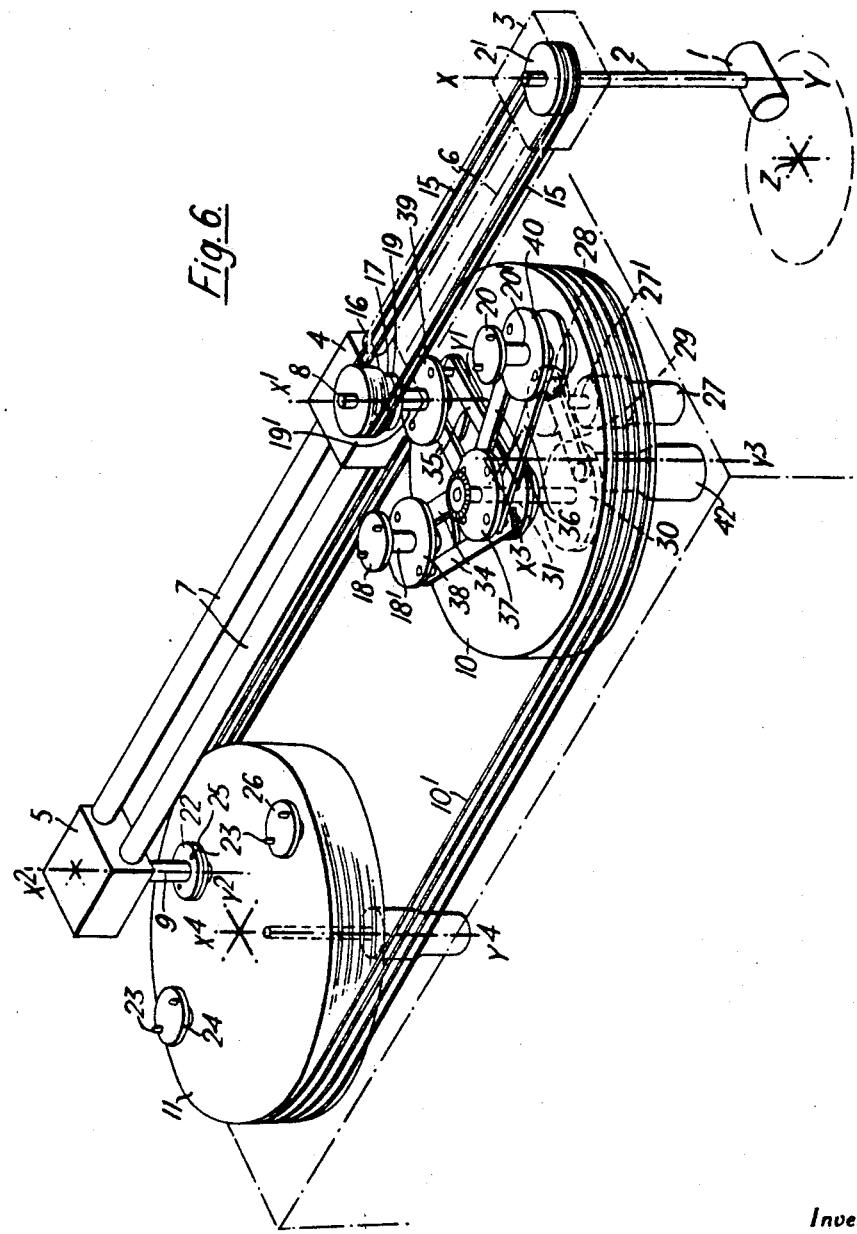

One form of apparatus for carrying the invention into practical effect is illustrated in the accompanying drawings: in those drawings FIGURE 1 is a front elevation of the apparatus, FIGURE 2 is a plan looking in the direction of the arrow II FIGURE 1, FIGURE 3 is a section taken on the line III—III FIGURE 2, FIGURE 4 is a section on the line IV—IV FIGURE 2, FIGURE 5 is a local section taken on the line V—V FIGURE 4, and FIGURE 6 is a perspective view of the upper operating part of the apparatus.

Referring to the drawings, the probe is indicated at 1, this probe being carried by a support 2 which can turn about its longitudinal axis X–Y in a head 3 at one end of a frame comprising heads 4, 5 and connecting members 6, 7. Means which will later be described cause the support 2 to pivot back and forth about axis X–Y, i.e. to oscillate through a selected arc.

The purpose of the apparatus is to cause the frame to move to carry the axis X–Y of the probe support about a circular or part circular path having a virtual centre Z and at the same time to oscillate the probe support about its axis X–Y, so that the beam issuing from the probe 1 is directed towards the centre Z at some point in each oscillation and for each position of the probe along this path. It is also the purpose of the apparatus to enable the radius of the path centred on Z to be adjusted to suit different cases.

To obtain this result the heads 4, 5 are carried by posts 8, 9 which are mounted to turn about their longitudinal axes $X^1Y^1$, $X^2Y^2$ in drums 10, 11 which are themselves supported to rotate about axes $X^3Y^3$, $X^4Y^4$ parallel with the axes of the posts 8, 9 and hence with the axis X–Y of the probe. The axes of the posts 8, 9 are radially offset from the axes of rotation of the drums which are supported by bearings 12, 13.

Hence when the two drums are turned, the frame carrying the probe 2 is caused to be displaced with the result that the head 3 and hence the probe 1 is caused to move through a curved path, the radius of which will depend on the relative radial settings of the axes $X^1Y^1$ and $X^3Y^2$. The drums 10, 11 are connected to turn in unison by a flexible band $10^1$ which engages in peripheral recesses in the drums. The rotational movement of the drums is effected in the case shown by an electric motor 14.

The post 8 has a flange 17 forming part of a pin and socket connection which can be fitted to any one of a number of discs mounted at different radial settings on the drum 10. In the particular case shown three discs 18, 19 and 20 are used, these being at the radial dimensions $R^1$, $R^2$, $R^3$, respectively, and each disc has pins 21 to enter openings in the flange 17. The post 9 carried by the head 5 is also formed with a flange 22 which can be connected via a similar pin and socket connection 23 to any one of three discs 24, 25, 26 mounted to turn on the drum 11 at different radial dimensions corresponding to those of the discs 18, 19, 20.

By selection of the discs 18, 19, 20 to which the flange 17 is attached and a selection of the discs 24, 25, 26 to which the flange 22 is attached, the radius of the path swept by the probe 1 about the centre Z can be varied to suit the estimated depth of the concealed surface which is to be explored by the beam from the probe 1.

In order now to turn the probe 1 about the axis X-Y, the support 2 carrying the probe 1 has connected to it a pulley $2^1$ which is connected by a flexible band 15 to a pulley 16 on the post 8.

The various discs 18–20, to any one of which the probe 1 is drivingly connected via the pulley 16, the band 15, and the flange 17, are arranged to be turned by a reversible electric motor 27 which through a spindle $27^1$ drives a disc 28 coupled by a link 29 to a disc 30 on a shaft 31. The motor 27 is energised under the control of a switch 32 operated by a cam 33 on the spindle $27^1$ so that this motor drives the spindle backwards and forwards. The resulting oscillatory motion of spindle 31 is transmitted to the various discs 18–20 via three sets of links 34, 35, 36 which are pivotally connected at one end to a drum 37 on the spindle 31 and at the other end to flanges 38, 39, 40 on spindles $18^1$, $19^1$, $20^1$ having the flanges 18, 19, 20.

Thus when the motors 14 and 27 are energised the drums 10, 11 are angularly driven to carry the probe 1 in the path curved about the centre Z and at the same time the probe itself is turned back and forth about its axis to cause its beam to be directed to the centre Z at some point in each oscillation and for each position of the probe along the curved path. As a result the concealed surface is swept from a multiplicity of angles as is required.

In the particular case shown an indication is afforded by a trace on the screen of a cathode ray tube 42 to which movements corresponding to the movement of the probe 1 are imparted: As is shown the cathode ray tube is carried by a supporting frame 43 which is itself mounted to turn in the drum 10 about a centre C offset from the centre of the spindle 31. Thus this tube 42 is caused to partake of the same movement as that of the probe, with the result that the trace on the screen of the tube will correspond to the movement of the probe with bright spots appearing on the screen at zones along the trace proportional to the situation of the concealed reflective surface.

In some cases a camera 45 can be provided to provide a photographic record of the image on the screen of the cathode ray tube.

I claim:

1. An ultrasonic test apparatus for producing cross sections of solid bodies comprising a probe, means for energizing said probe by ultrasonic energy to produce an echo from a concealed surface in a solid body, means for moving said probe through a predetermined locus, observation means for displaying the echoes received by said probe, and means for mounting said observation means upon said probe moving means to position and orient the observation means in accordance with the positions and orientations of the probe.

2. An apparatus as claimed in claim 1, in which said probe moving means comprises a support carrying said probe, means for rotating said supporting about its own axis and causing the probe to oscillate through a predetermined angle, and means for simultaneously displacing said support along a curved path around a central axis, said central axis intersecting a line which bisects said predetermined angle.

3. An apparatus as claimed in claim 2, and further comprising means for varying the diameter of the curved path followed by said support.

4. An apparatus as claimed in claim 1, in which said observation means comprises a cathode ray tube.

5. An apparatus as claimed in claim 4, and further comprising a camera for producing a record of the indications on the screen of said cathode ray tube.

6. An apparatus as claimed in claim 1, in which said probe moving means includes means for rotating the probe about an axis and causing it to oscillate through a predetermined angle, and means for simultaneously displacing the probe along a curved path around a central axis, said central axis intersecting a line which bisects said predetermined angle, the axis of said oscillations and said central axis being substantially parallel.

7. An apparatus as claimed in claim 1, in which said probe moving means includes means for rotating the probe about an axis and causing it to oscillate through a predetermined angle, and means for simultaneously displacing the probe along a curved path around a central point, said central point lying on a line which bisects said predetermined angle, the axis of said oscillations and the axis of the curved path being substantially parallel.

8. An ultrasonic test apparatus for producing cross sections of solid bodies comprising a probe; means for energizing said probe by ultrasonic energy to produce an echo from a concealed surface within a solid body; means for moving said probe through a predetermined locus including two angularly movable components, a support carrying said probe, frame means for mounting said support at two spaced points upon said components, means for rotating said support about its own axis and causing the probe to oscillate through a predetermined angle, and means for rotating said components in unison to displace the probe along a curved path around a central axis, said central axis intersecting a line which bisects said predetermined angle; observation means for displaying the echoes received by said probe; and means for mounting said observation means upon said probe moving means to position and orient the observation means in accordance with the various positions and orientations of the probe.

9. An ultrasonic test apparatus for producing cross sections of solid bodies comprising a probe; means for energizing said probe by ultrasonic energy to produce an echo from a concealed surface within a solid body; means for moving said probe through a predetermined locus including two angularly movable components, a support carrying said probe, frame means for mounting said support at two spaced points upon said components, means for rotating said support about its own axis and causing the probe to oscillate through a predetermined angle, and means for rotating said components in unison to displace the probe along a curved path around a central axis, said central axis intersecting a line which bisects said predetermined angle; observation means for displaying the echoes received by said probe; and means for mounting said observation means directly upon one of said angularly movable components, said observation means being continuously positioned and oriented in correspondence with the various positions and orientations of the probe.

10. An ultrasonic test apparatus for producing cross sections of solid bodies comprising a probe, means for energizing said probe with ultrasonic energy to produce an echo from a concealed surface within a solid body, a pair of angularly movable components, each component having a plurality of coupling elements located thereon at varying radial distances from its center, a pivoted member mounted on one of said components for oscillation through a predetermined angle, a support carrying said probe, frame means carrying said support and connected by two selected coupling elements to said pair of components, means for connecting said probe to said pivoted member to cause it to oscillate in synchronism with the pivoted member, means for rotating said components in unison to displace the probe along a curved path around a central axis, said central axis intersecting a line which bisects said predetermined angle, observation means for displaying the echoes received by said probe, and means for mounting said observation means upon said pivoted member to position and orient the observation means in accordance with the positions and orientations of the probe.

11. An ultrasonic test apparatus for producing cross sections of solid bodies comprising a probe, means for energizing said probe with ultrasonic energy to produce an echo from a concealed surface within a solid body, a pair of angularly movable components, a first pivoted member mounted on one of said components for oscillation through a predetermined angle, a plurality of second pivoted members mounted on said one component at different distances from its axis of rotation, parallel linkage means for connecting said first pivoted member to each of the second pivoted members, a support carrying said probe, frame means carrying said support, coupling means including a selected one of said second pivoted members for connecting said frame means to said pair of components, pulley and band means for connecting said probe to the selected second pivoted member to cause the probe to oscillate in synchronism therewith, means for rotating said components in unison to displace the probe along a curved path around a central axis, said central axis intersecting a line which bisects said predetermined angle, observation means for displaying the echoes received by said probe, and means for mounting said observation means upon said first pivoted member to position and orient the observation means in correspondence with the positions and orientations of the probe.

12. An ultrasonic test apparatus for producing cross sections of solid bodies comprising a probe; means for energizing said probe with ultrasonic energy to produce an echo from a concealed surface within a solid body; means for moving said probe through a predetermined locus including means for causing the probe to pivot about an axis so that it oscillates through a predetermined angle, and means for simultaneously causing the probe to traverse a curved path around a central axis, said central axis intersecting a line which bisects said predetermined angle, the axis of said oscillations and said central axis being substantially parallel; observation means for displaying the echoes received by said probe; and means for mounting said observation means upon said probe moving means to position and orient the observation means in accordance with the positions and orientations of the probe.

References Cited by the Examiner
UNITED STATES PATENTS

| | | | |
|---|---|---|---|
| 3,023,611 | 3/1962 | Howry | 73—67.8 |
| 3,086,390 | 4/1963 | Brown | 73—67.8 |

RICHARD C. QUEISSER, *Primary Examiner.*

JOSEPH P. STRIZAK, *Examiner.*